US012538897B1

(12) United States Patent
Zhu

(10) Patent No.: US 12,538,897 B1
(45) Date of Patent: Feb. 3, 2026

(54) PET GARMENT

(71) Applicant: Yudong Zhu, Jiangsu (CN)

(72) Inventor: Yudong Zhu, Jiangsu (CN)

( * ) Notice: Subject to any disclaimer, the term of this patent is extended or adjusted under 35 U.S.C. 154(b) by 0 days.

(21) Appl. No.: 19/212,816

(22) Filed: May 20, 2025

(51) Int. Cl.
*A01K 13/00* (2006.01)
(52) U.S. Cl.
CPC .................................. *A01K 13/006* (2013.01)
(58) Field of Classification Search
CPC .... A01K 13/006; A01K 13/008; A01K 23/00; A01K 21/00; A61D 9/00
See application file for complete search history.

(56) References Cited

U.S. PATENT DOCUMENTS

| | | | | |
|---|---|---|---|---|
| 7,793,619 B2* | 9/2010 | Kajanoff | ............... | A01K 13/006 54/79.2 |
| 8,733,296 B1* | 5/2014 | Douglas | ............... | A01K 13/006 119/856 |
| 9,226,859 B1* | 1/2016 | Knight | ................... | A01K 23/00 |
| 10,694,720 B2* | 6/2020 | Bedenbaugh | ........ | A01K 13/006 |
| 2011/0226193 A1* | 9/2011 | Williams | ............... | A01K 23/00 119/850 |
| 2012/0067298 A1* | 3/2012 | Rich | ...................... | A01K 23/00 119/856 |
| 2015/0068469 A1* | 3/2015 | Potts | ................... | A61F 13/5622 119/850 |
| 2017/0290293 A1* | 10/2017 | Spanovic | ............. | A01K 13/006 |
| 2018/0325641 A1* | 11/2018 | Williams | ................ | A61D 9/00 |
| 2020/0367472 A1* | 11/2020 | Zarras | .................. | A01K 13/006 |
| 2022/0000598 A1* | 1/2022 | Thompson | ............... | A61D 9/00 |
| 2022/0053733 A1* | 2/2022 | Oakes | ....................... | A61D 9/00 |
| 2022/0125013 A1* | 4/2022 | Reist | ..................... | A01K 13/006 |
| 2022/0287271 A1* | 9/2022 | Sparks | ................. | A01K 13/006 |
| 2022/0400654 A1* | 12/2022 | Kosanke | ................ | A01K 23/00 |
| 2023/0189761 A1* | 6/2023 | Martin | .............. | A61F 13/49004 604/398 |

* cited by examiner

*Primary Examiner* — Trinh T Nguyen
(74) *Attorney, Agent, or Firm* — JEEN IP LAW, LLC

(57) ABSTRACT

A pet garment is provided, including a front covering portion and a rear covering portion. The front covering portion is configured to cover a front area of a pet torso, and the front covering portion extends rearward to form the rear covering portion. The rear covering portion includes a rear back portion and a care portion, the rear back portion is anteriorly disposed and configured to cover a rear back area of the pet torso, and the care portion is posteriorly disposed and configured to wrap around a pet tail and extend frontward to cover an abdomen area of the pet torso. The care portion extends leftward to form a left connecting strap and extends rightward to form a right connecting strap.

20 Claims, 12 Drawing Sheets

PET GARMENT

TECHNICAL FIELD

The present disclosure relates to the field of pet supplies, and in particular to a pet garment.

BACKGROUND

When pets (e.g., dogs, cats, etc.) undergo surgical procedures, such as spay/neuter operations, or sustain injuries, the pets tend to instinctively lick surgical sites or wounds. Persistent licking behavior typically impedes proper healing of the surgical sites or the wounds while increasing infection risks. To address this issue, protective pet garments with medical care functions have been developed in the art. Current protective pet garments generally cover torsos of the pets to prevent access to the surgical sites or the wounds. However, such protective pet garments lack user-friendly features for convenient dressing of the pets and inadequately accommodate natural movements of the pets during daily activities after being worn on the pets. These shortcomings become particularly pronounced during extended recovery periods following major surgical interventions, such as sterilization procedures.

SUMMARY

In order to overcome defects in the prior art, the present disclosure provides a pet garment.

Technical solutions adopted by the present disclosure are as follows.

The present disclosure provides the pet garment, including a front covering portion and a rear covering portion. The front covering portion is configured to cover a front area of a pet torso, and the front covering portion extends rearward to form the rear covering portion. The rear covering portion includes a rear back portion and a care portion, the rear back portion is anteriorly disposed and configured to cover a rear back area of the pet torso, and the care portion is posteriorly disposed and configured to wrap around a pet tail and extend frontward to cover an abdomen area of the pet torso. The care portion extends leftward to form a left connecting strap and extends rightward to form a right connecting strap, the left connecting strap and the right connecting strap are respectively disposed at a left side of the care portion and a right side of the right side of the care portion for fixation, so that the rear covering portion covers a rear area of the pet torso.

In some embodiments, the front covering portion includes a front back portion. A first limiting component is disposed on the front back portion, a second limiting component is disposed on the rear back portion, the first limiting component is connected to the second limiting component to form a limiting space. The left connecting strap and the right connecting strap are configured to be wrapped into the limiting space.

In some embodiments, the first limiting component and the second limiting component are detachably connected.

In some embodiments, the first limiting component includes a limiting strap, a first end of the limiting strap is connected to the front back portion, and a first engagement portion is disposed at a second end of the limiting strap. The second limiting component is a second engagement portion. When the first engagement portion is engaged with the second engagement portion, the limiting strap is enclosed to form the limiting space.

In some embodiments, the left connecting strap and the right connecting strap are connected in the limiting space.

In some embodiments, the left connecting strap and the right connecting strap are detachably connected.

In some embodiments, the care portion is separable from the abdomen area of the pet torso upon disconnection of the left connecting strap and the right connecting strap.

In some embodiments, when the care portion is separated from the abdomen area of the pet torso, the care portion is located posterior of the rear back portion, then the left connecting strap is connected to the right connecting strap to form a rolling core, the rolling core is sequentially rolled along an outer side of the care portion and an outer side of the rear back portion to roll up and store the care portion and the rear back portion.

In some embodiments, a third engagement portion is disposed on an inner side of the rear back portion, when the care portion and the rear back portion are rolled up and stored, the limiting strap is engaged with the third engagement portion through the first engagement portion to prevent displacement of the care portion and the rear back portion.

In some embodiments, a flexible care layer is disposed on an inner side of the care portion, a care space is formed between the flexible care layer and the care portion, when the care portion is rolled up and stored, the flexible care layer is rolled up and stored along with the care portion.

In some embodiments, the left connecting strap and the right connecting strap are detachably connected, the care portion is separable from the abdomen area of the pet torso upon the disconnection of the left connecting strap and the right connecting strap. When the care portion is separated from the abdomen area of the pet torso, the care portion is located posterior of the rear back portion, then the left connecting strap is connected to the right connecting strap to form the rolling core, the rolling core is sequentially rolled along an outer side of the care portion and an outer side of the rear back portion to roll up and store the care portion and the rear back portion.

In some embodiments, a flexible care layer is disposed on an inner side of the care portion, a care space is formed between the flexible care layer and the care portion, when the care portion is rolled up and stored, the flexible care layer is rolled up and stored along with the care portion.

In some embodiments, the flexible care layer is made of cotton fabric.

In some embodiments, the left connecting strap is rightwardly bent toward the care portion, the right connecting strap is leftwardly bent toward the care portion, and the left connecting strap and the right connecting strap are connected at the care portion to form the rolling core at the care portion.

In some embodiments, the care space extends into the left connecting strap to form a left access opening, the left access opening is closed after bending of the left connecting strap. The care space extends into the right connecting strap to form a right access opening, the right access opening is closed after bending of the right connecting strap.

In some embodiments, a fourth engagement portion is disposed on the left connecting strap and a fifth engagement portion is disposed on the right connecting strap for enabling detachable connection between the left connecting strap and the right connecting strap.

In some embodiments, the care space is configured to accommodate nursing items selected from heat packs, ice packs, and absorbent pads.

In some embodiments, the care portion, the left connecting strap, and the right connecting strap form a T-shaped structure.

In some embodiments, a tail opening is defined at a junction between the rear back portion and the care portion, when the care portion is wrapped around the pet tail, the tail opening allows the pet tail to pass through.

In some embodiments, the front covering portion and the rear covering portion are made of elastic material.

Beneficial effects of the present disclosure are as following.

During use of the pet garment, the front covering portion is worn on the front area of the pet torso. The front covering portion extends rearward to form the rear covering portion, the rear covering portion includes the rear back portion and the care portion, the rear back portion is anteriorly disposed and the care portion is posteriorly disposed, the rear back portion is wrapped on the rear back area of the pet torso and the care portion is wrapped around the pet tail and extend frontward to wrap the abdomen area of the pet torso. Moreover, the care portion is secured by the left connecting strap and the right connecting strap, allowing the rear covering portion to wrap around the rear area of the pet torso, so as to provide full coverage of the pet torso, which is simple in structure and convenient in dressing. For example, after surgical procedures, such as spay/neuter operations, the care portion effectively protects the abdomen area of the pet torso to prevent a pet from licking surgical sites.

BRIEF DESCRIPTION OF DRAWINGS

In order to more clearly illustrate technical solutions in embodiments of the present disclosure, accompanying drawings required in description of the embodiments are briefly described below, and the accompanying drawings in the following description are merely some embodiments of the present disclosure, and for those who skilled in the art, other drawings may be obtained according to these accompanying drawings without creative efforts.

The present disclosure is further described below with reference to the accompanying drawings and the embodiments.

DETAILED DESCRIPTION OF EMBODIMENTS

Figure 1:
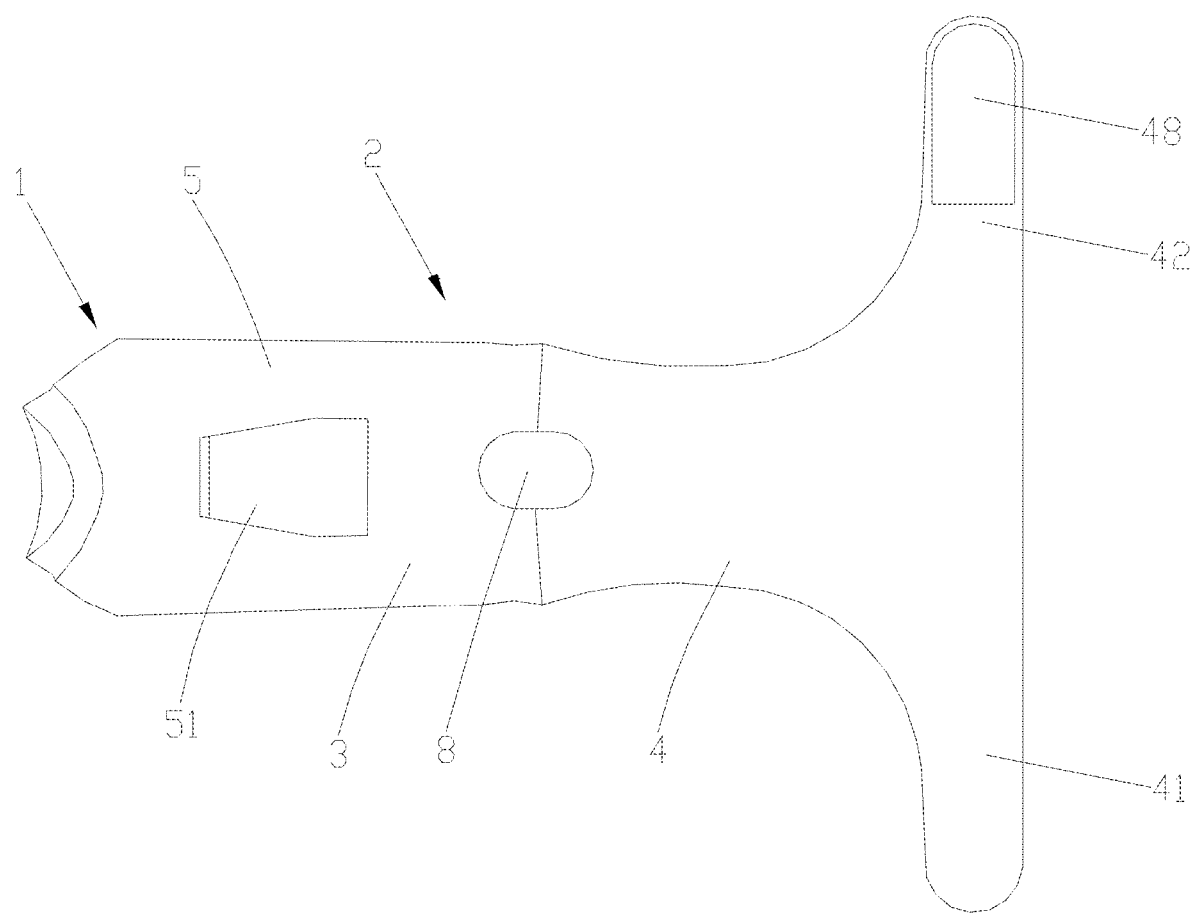
FIG. 1 is a structural schematic diagram illustrating a rear portion of a pet garment according to the present disclosure.
Figure 2:
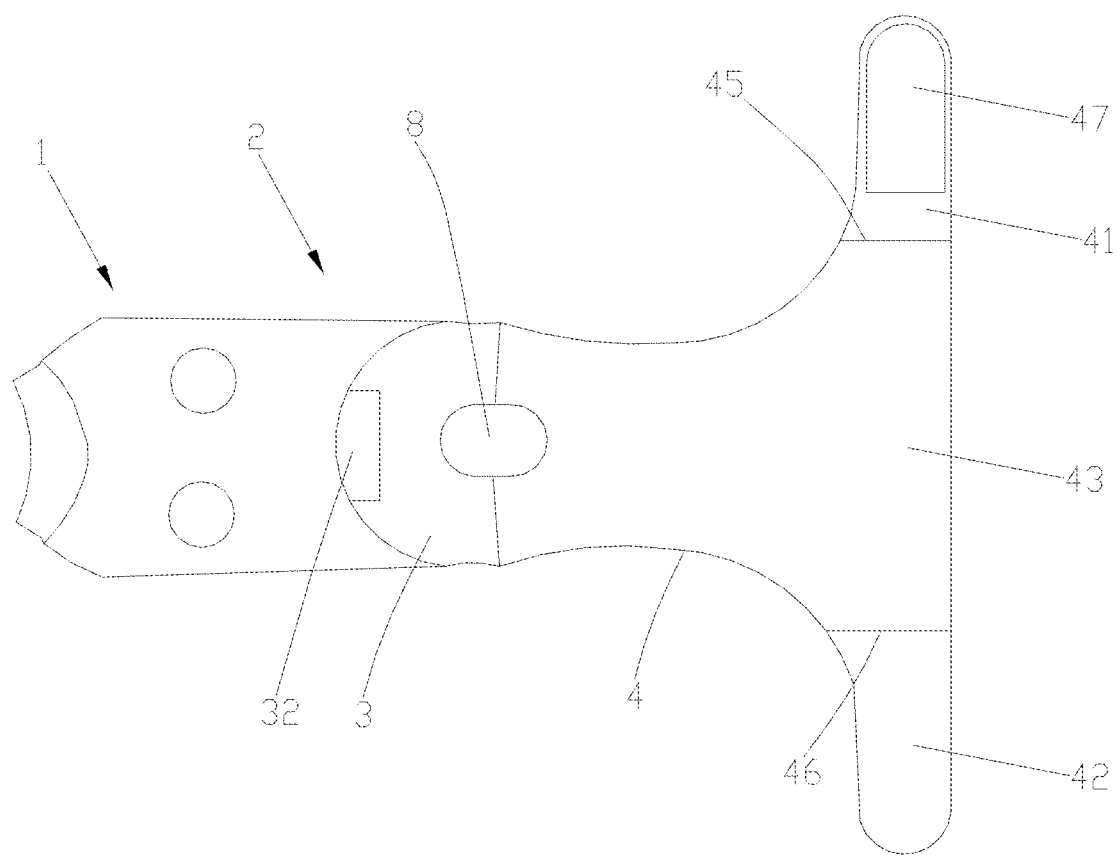
FIG. 2 is a structural schematic diagram illustrating a chest portion and an abdomen portion of the pet garment according to the present disclosure.
Figure 3:
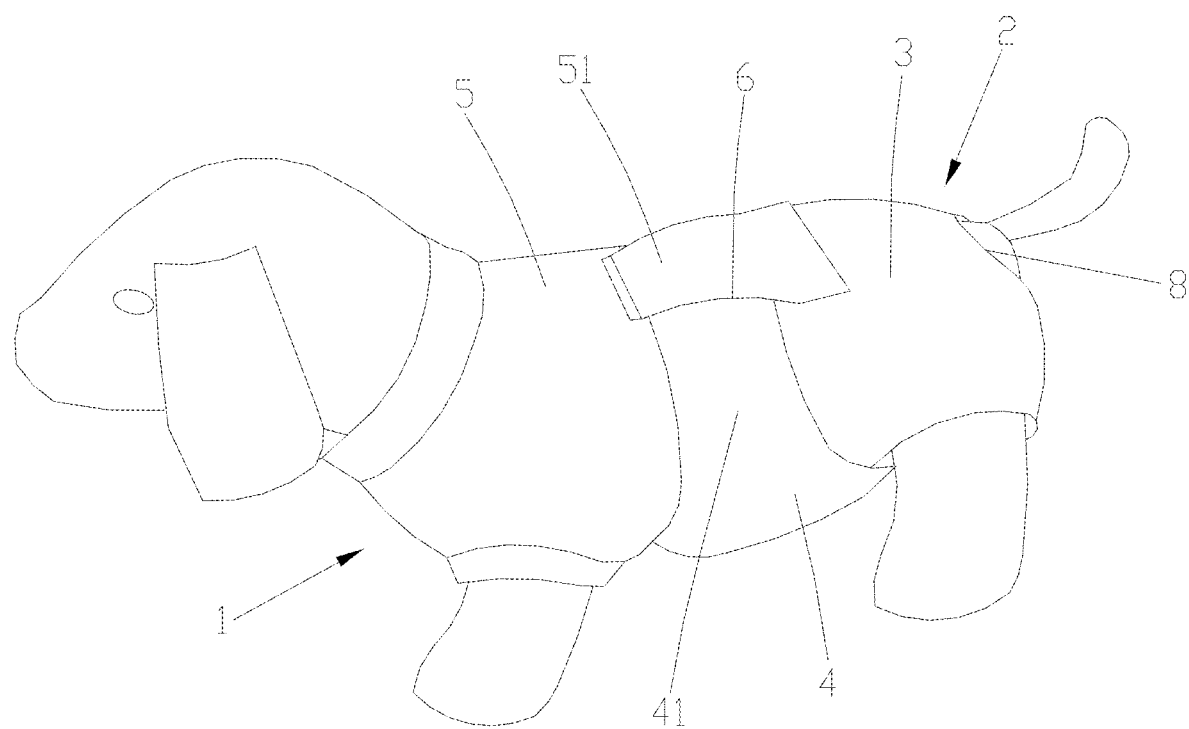
FIG. 3 is a structural schematic diagram illustrating a wearing state of the pet garment according to the present disclosure.
Figure 4:
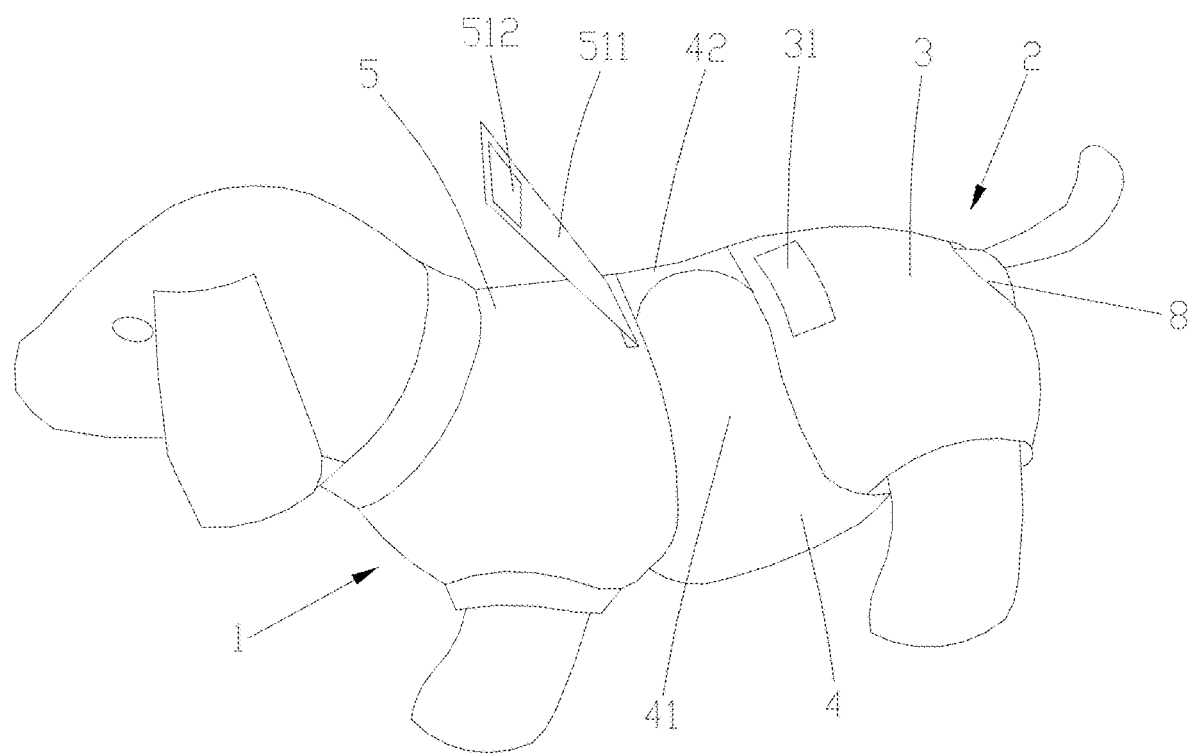
FIG. 4 is a structural schematic diagram illustrating a wearing state of the pet garment according to the present disclosure, in which a limiting strap is opened.
Figure 5:
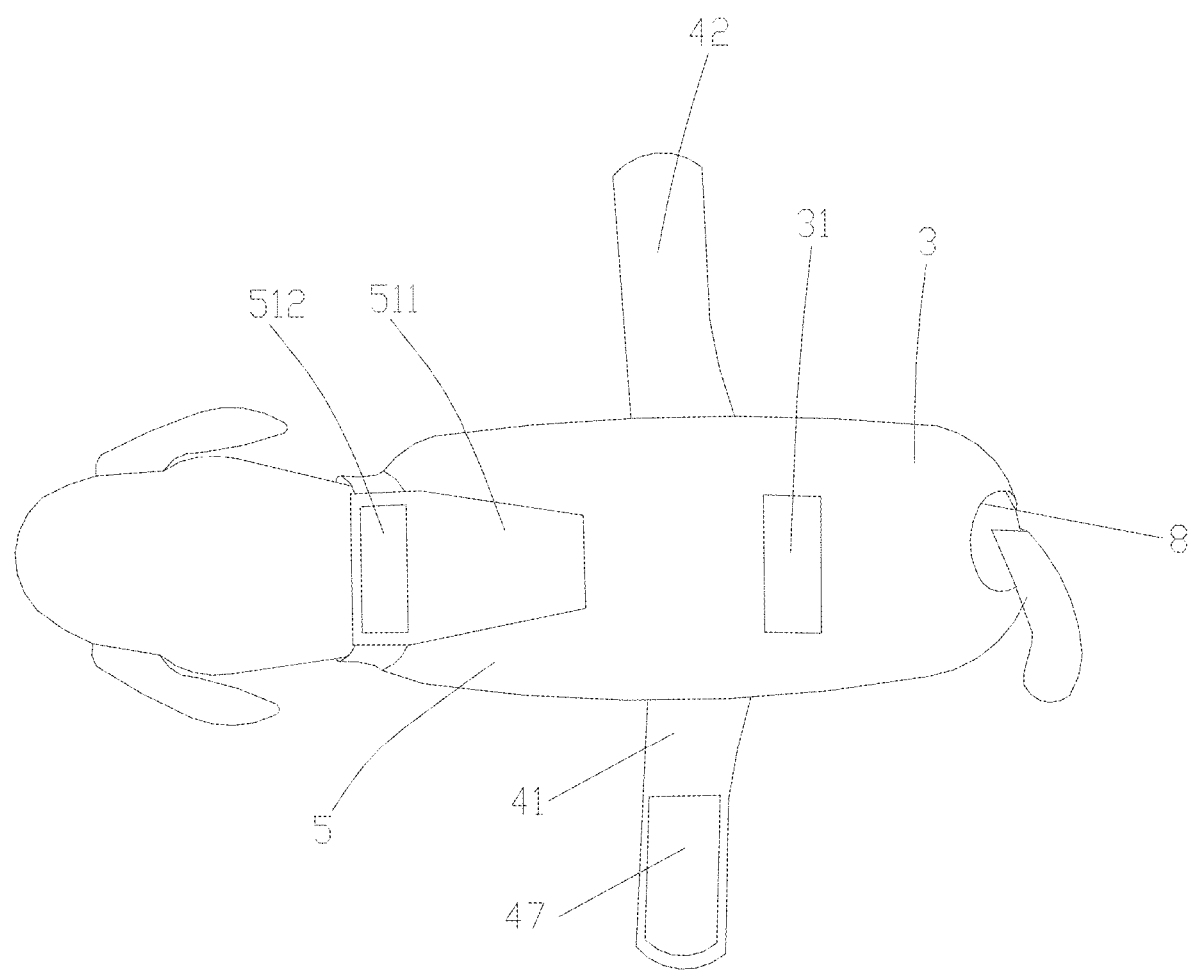
FIG. 5 is a structural schematic diagram illustrating a wearing state of the pet garment according to the present disclosure, in which the limiting strap, a left connecting strap, and a right connecting strap are opened
Figure 6:
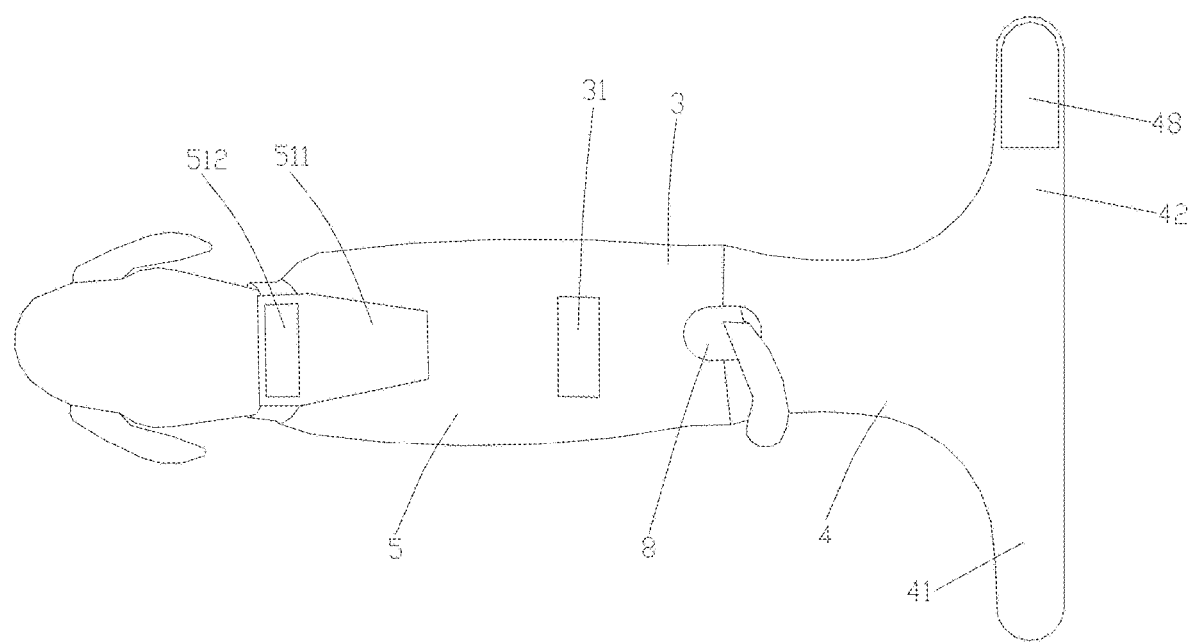
FIG. 6 is a schematic diagram illustrating a care portion being separated from an abdomen area of a pet torso based on the wearing state of the pet garment shown in FIG. 5.
Figure 7:
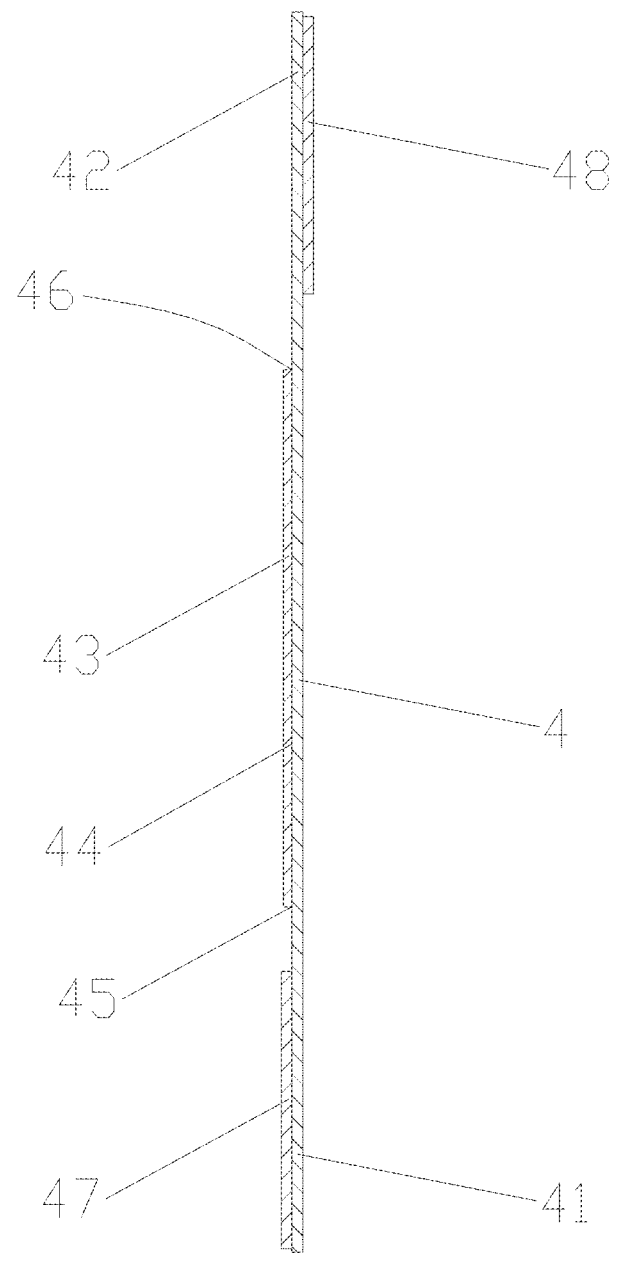
FIG. 7 is a cross-sectional schematic diagram taken along the left connecting strap and the right connecting strap shown in FIG. 6.
Figure 8:
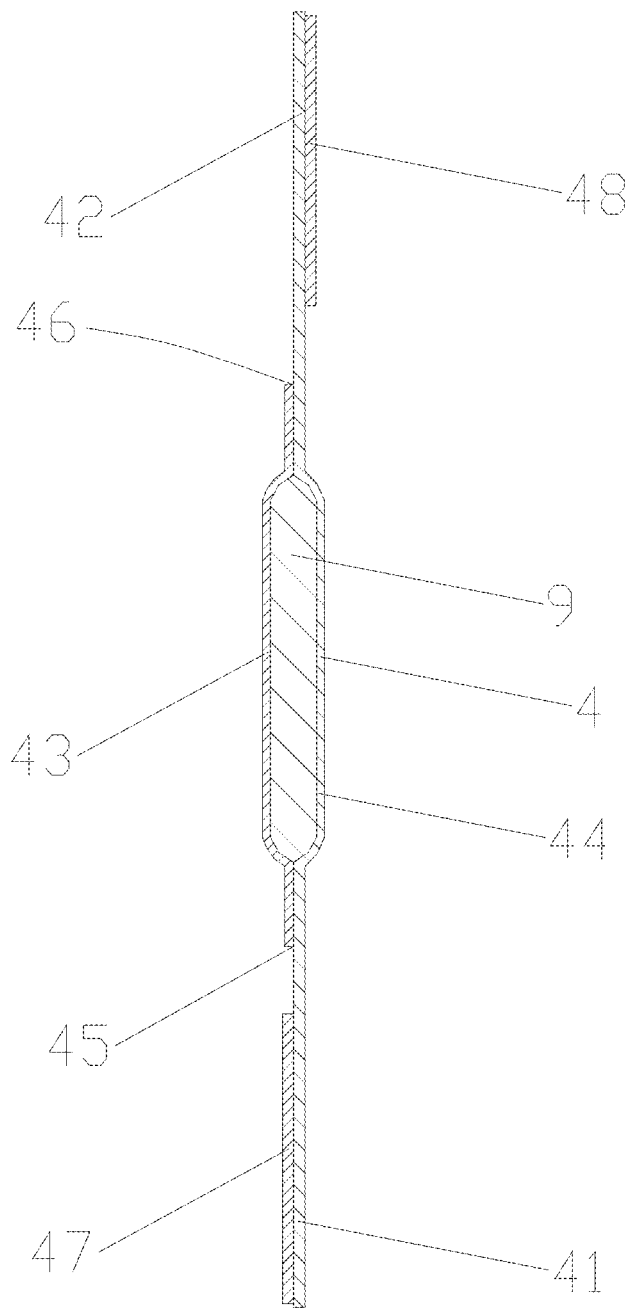
FIG. 8 is a schematic diagram illustrating a nursing item being accommodated in the pet garment shown in FIG. 7.
Figure 9:
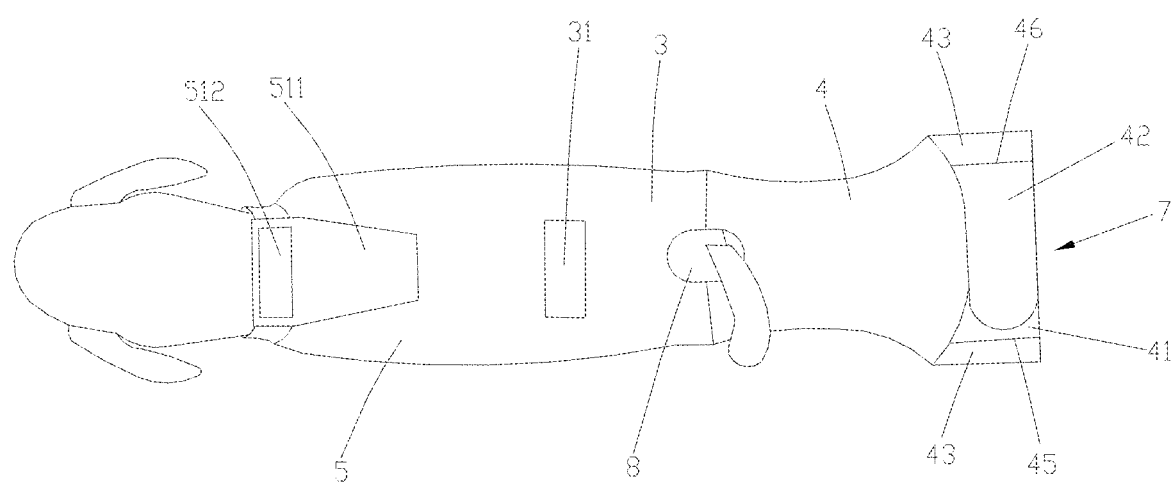
FIG. 9 is a schematic diagram of forming a rolling core by connecting the left connecting strap and the right connecting strap shown in FIG. 6.
Figure 10:
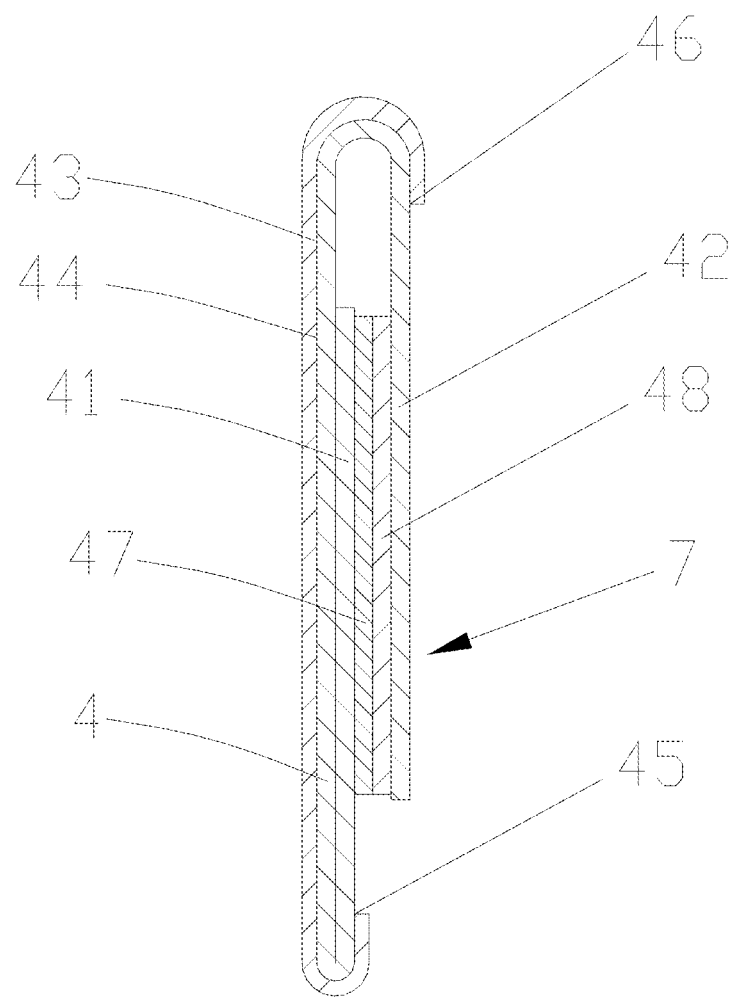
FIG. 10 is a cross-sectional schematic diagram taken along the left connecting strap and the right connecting strap shown in FIG. 9.
Figure 11:
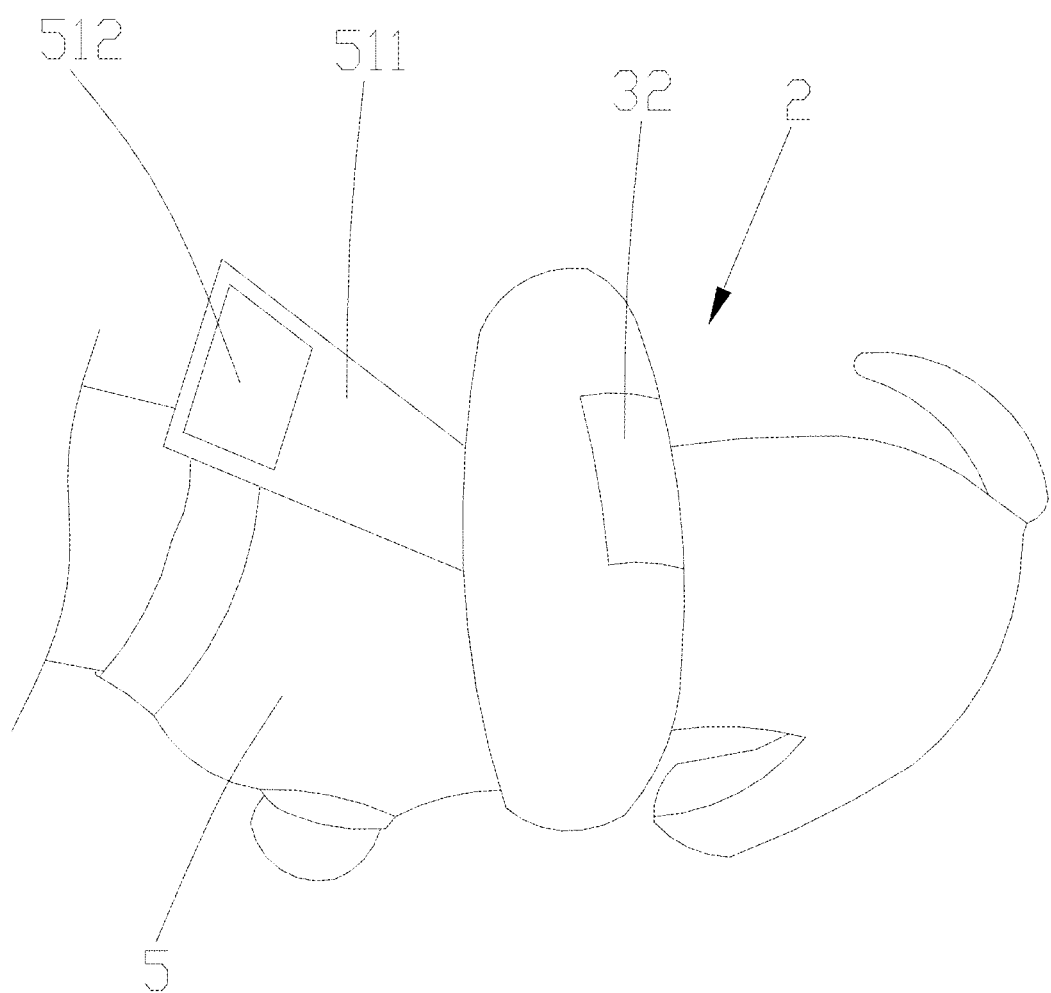
FIG. 11 is a schematic diagram of rolling up and storing the care portion and the rear back portion shown in FIG. 9.
Figure 12:
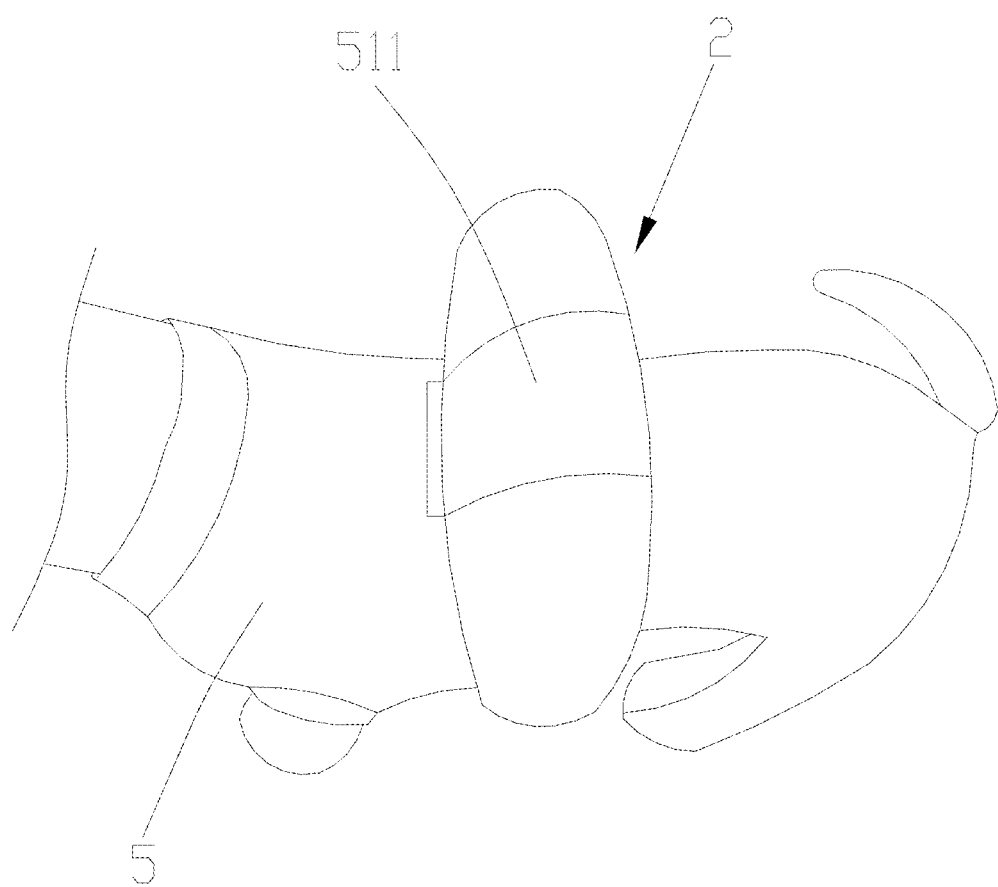
FIG. 12 is a schematic diagram of the care portion and the rear back portion shown in FIG. 11 being rolled up and stored.

Referring to FIGS. 1-8, the present disclosure provides a per garment, including a front covering portion 1 and a rear covering portion 2. The front covering portion 1 is configured to cover a front area of a pet torso, and the front covering portion 1 extends rearward to form the rear covering portion 2. The rear covering portion 2 includes a rear back portion 3 and a care portion 4, the rear back portion 3 is anteriorly disposed and configured to cover a rear back area of the pet torso, and the care portion 4 is posteriorly disposed and configured to wrap around a pet tail and extend frontward to cover an abdomen area of the pet torso. The care portion 4 extends leftward to form a left connecting strap 41 and extends rightward to form a right connecting strap 42, the left connecting strap 41 and the right connecting strap 42 are respectively disposed at a left side of the care portion 4 and a right side of the right side of the care portion 4 for fixation, so that the rear covering portion 2 covers a rear area of the pet torso.

Specifically, the front area of the pet torso includes a front back area and a chest area, the front covering portion 1 covers the front back area and the chest area. The rear area of the pet torso includes the rear back area and the abdomen area, the abdomen area includes a penis or a uterus and an anus, the rear covering portion covers the rear back area and the abdomen area.

During use of the pet garment, the front covering portion 1 is worn on the front area of the pet torso. The front covering portion 1 extends rearward to form the rear covering portion 2, the rear covering portion 2 includes the rear back portion 3 and the care portion 4, the rear back portion 3 is anteriorly disposed and the care portion 4 is posteriorly disposed, the rear back portion 3 is wrapped on the rear back area of the pet torso and the care portion 4 is wrapped around the pet tail and extend frontward to wrap the abdomen area of the pet torso. Moreover, the care portion 4 is secured by the left connecting strap 41 and the right connecting strap 42, allowing the rear covering portion 2 to wrap around the rear area of the pet torso, so as to provide full coverage of the pet torso, which is simple in structure and convenient in dressing. For example, after surgical procedures, such as spay/neuter operations, the care portion 4 effectively protects the abdomen area of the pet torso to prevent a pet from licking surgical sites.

Specifically, the first limiting component 51 and the second limiting component 31 are detachably connected, which is convenient for the left connecting strap 41 and the right connecting strap 42 to be wrapped into the limiting space 6.

Furthermore, the first limiting component 51 includes a limiting strap 511, a first end of the limiting strap 511 is connected to the front back portion 5, and a first engagement portion 512 is disposed at a second end of the limiting strap 511. The second limiting component 31 is a second engagement portion. When the first engagement portion 512 is engaged with the second engagement portion, the limiting strap 511 is enclosed to form the limiting space 6. Specifically, the first engagement portion 512 is a hook portion of a first hook-and-loop fastener, correspondingly, the second engagement portion is a loop portion of a second hook-and-loop fastener.

Furthermore, the left connecting strap 41 and the right connecting strap 42 are connected in the limiting space 6, and the left connecting strap 41 and the right connecting strap 42 are detachably connected. Specifically, the left connecting strap 41 includes the hook portion of the first hook-and-loop fastener, the right connecting strap 42 includes the loop portion of the second hook-and-loop fastener, so as to achieve detachable connection therebetween. Moreover, when the first engagement portion 512 of the limiting strap 511 is detached from the second engagement portion, the limiting space 6 is in an open state, at this time, the first connecting strap 41 and the second connecting strap 42 become accessible for connection or disconnection operations.

When the left connecting strap 41 is disconnected with the right connecting strap 42, the care portion 4 is separable from the abdomen area of the pet torso, enabling unobstructed urination and defecation of the pet, which optimally adapts to physiological demands of the pet during extended recovery periods.

Furthermore, when the care portion 4 is separated from the abdomen area of the pet torso, the care portion 4 is located posterior of the rear back portion 3, then the left connecting strap 41 is connected to the right connecting strap 42 to form a rolling core 7, the rolling core 7 is sequentially rolled along an outer side of the care portion 4 and an outer side of the rear back portion 3 to roll up and store the care portion 4 and the rear back portion 3. When the pet needs to urinate or defecate, the care portion 4 and the rear back portion 3 are sequentially rolled up to prevent the pet garment, especially the care portion 4, from coming into contact with waste of the pet, so as to help maintain cleanliness and hygiene.

Furthermore, a third engagement portion 32 is disposed on an inner side of the rear back portion 3, when the care portion 4 and the rear back portion 3 are rolled up and stored, the limiting strap 511 is engaged with the third engagement portion 32 through the first engagement portion 512 to prevent displacement of the care portion 4 and the rear back portion 3. After the first engagement portion 512 of the limiting strap 511 is engaged with the third engagement portion 32, the pet may freely urinate or defecate, the pet garment of the present disclosure is convenient in use. Moreover, since the first engagement portion 512 is the hook portion of the first hook-and-loop fastener, correspondingly, the third engagement portion 32 is a loop portion of a third hook-and-loop fastener.

A flexible care layer 43 is disposed on an inner side of the care portion 4, and the flexible care layer 43 is made of cotton fabric, which prevents any potential harm from contact or rubbing against the surgical sites on the abdomen area of the pet torso, offering additional protection.

Furthermore, a care space 44 is formed between the flexible care layer 43 and the care portion 4, when the care portion 4 is rolled up and stored, the flexible care layer 43 and the care space 44 are both rolled up and stored along with the care portion 4. Specifically, the care space 44 is configured to accommodate nursing items 9 selected from heat packs, ice packs, and absorbent pads. For example, placing the heat pads in the care space 44 allows for heat therapy on the surgical sites; placing the ice packs in the care space 44 allows for cold therapy on the surgical sites; and placing the absorbent pads in the care space 44 allows for absorbing urine of the pet.

Furthermore, the left connecting strap 41 is rightwardly bent toward the care portion 4, the right connecting strap 42 is leftwardly bent toward the care portion 4, and the left connecting strap 41 and the right connecting strap 42 are connected at the care portion 4 to form the rolling core 7 at the care portion 4, which is convenient for rolling up and storing the care portion 4 and the rear back portion 3, that is, the rear covering portion 2.

Furthermore, the care space 44 extends into the left connecting strap 41 to form a left access opening 45, the left access opening 45 is provided for convenient placement and retrieval of the nursing items 9 from a left side of the pet. When the left connecting strap 41 is bent or folded, the left access opening 45 of the care space 44 bends accordingly, thereby closing the left access opening 45 of the care space 44. In this way, the nursing items 9 are prevented from falling out of the left access opening 45, which is reasonable and ingenious in structural design.

Furthermore, the care space 44 extends into the right connecting strap 42 to form a right access opening 46, the right access opening 46 is provided for convenient placement and retrieval of the nursing items 9 from a right side of the pet. When the right connecting strap 42 is bent or folded, the right access opening 46 of the care space 44 bends accordingly, thereby closing the right access opening 46 of the care space 44. In this way, the nursing items 9 are prevented from falling out of the right access opening 46, which is reasonable and ingenious in structural design.

According to the above structure, the nursing items 9 is insertable and removable from both sides of the pet, which enhances user convenience.

Furthermore, a fourth engagement portion 47 is disposed on the left connecting strap 41 and a fifth engagement portion 48 is disposed on the right connecting strap 42 for enabling the detachable connection between the left connecting strap 41 and the right connecting strap 42. Specifically, the fourth engagement portion 47 is a hook portion of a fourth hook-and-loop fastener, correspondingly, the fifth engagement portion 48 is a loop portion of a fifth hook-and-loop fastener, the hook portion of the fourth hook-and-loop fastener and the loop portion of the fifth hook-and-loop fastener are engaged for achieving the detachable connection between the left connecting strap 41 and the right connecting strap 42. Moreover, use of the hook-and-loop fasteners requires the left connecting strap 41 and the right connecting strap 42 to be overlapped when connected. Combined with inherent rigidity of the hook-and-loop fasteners, such overlapping structure enhances stiffness of the rolling core 7 formed by connecting the left connecting strap 41 and the right connecting strap 42. In this way, better rolling performance is achieved for facilitating convenient rolling-up and storage operations of the care portion 4 and the rear back portion 3, an overall design is simple in structure, yet reasonable and ingenious.

Specifically, the care portion 4, the left connecting strap 41, and the right connecting strap 42 form a T-shaped structure. Such cooperative interaction among the care portion 4, the left connecting strap 41, and the right connecting strap 42 ensures a well-designed structure that provides secure and effective coverage of the abdomen area of the pet torso.

Specifically, a tail opening 8 is defined at a junction between the rear back portion 3 and the care portion 4, when the care portion 4 is wrapped around the pet tail, the tail opening 8 allows the pet tail to pass through, which is convenient for dressing of the pet garment.

Specifically, the front covering portion 1 and the rear covering portion 2 are made of elastic material, which is convenient for dressing of the pet garment, especially for the front covering portion 1.

The above descriptions provide one or more specific embodiments in conjunction with particular content. These descriptions are not intended to limit specific implementations of the present disclosure to only these examples. Any methods, structures, or designs that are similar, analogous, or derived from an inventive concept disclosed herein, including those resulting from technical derivations or substitutions made within a scope of premise of the present disclosure, shall be considered within a protection scope of the present disclosure.

What is claimed is:

1. A pet garment, comprising:
a front covering portion; and
a rear covering portion;
wherein the front covering portion is configured to cover a front area of a pet torso, and the front covering portion extends rearward to form the rear covering portion;
the rear covering portion comprises a rear back portion and a care portion, the rear back portion is anteriorly disposed and configured to cover a rear back area of the pet torso, and the care portion is posteriorly disposed and configured to wrap around a pet tail and extend frontward to cover an abdomen area of the pet torso;
the care portion extends leftward to form a left connecting strap and extends rightward to form a right connecting strap, the left connecting strap and the right connecting strap are respectively disposed at a left side of the care portion and a right side of the right side of the care portion for fixation, so that the rear covering portion covers a rear area of the pet torso;
the front covering portion comprises a front back portion, and a first limiting component is disposed on the front back portion,
the first limiting component comprises a limiting strap, a first end of the limiting strap is connected to the front back portion, and a first engagement portion is disposed at a second end of the limiting strap;
the second limiting component is a second engagement portion; and
a third engagement portion is disposed on an inner side of the rear back portion, when the care portion and the rear back portion are rolled up and stored, the limiting strap is engaged with the third engagement portion through the first engagement portion to prevent displacement of the care portion and the rear back portion.

2. The pet garment according to claim 1, wherein
a second limiting component is disposed on the rear back portion, the first limiting component is connected to the second limiting component to form a limiting space; and
the left connecting strap and the right connecting strap are configured to be wrapped into the limiting space.

3. The pet garment according to claim 2, wherein the first limiting component and the second limiting component are detachably connected.

4. The pet garment according to claim 3, wherein
when the first engagement portion is engaged with the second engagement portion, the limiting strap is enclosed to form the limiting space.

5. The pet garment according to claim 4, wherein the left connecting strap and the right connecting strap are connected in the limiting space.

6. The pet garment according to claim 5, wherein the left connecting strap and the right connecting strap are detachably connected.

7. The pet garment according to claim 6, wherein the care portion is separable from the abdomen area of the pet torso upon disconnection of the left connecting strap and the right connecting strap.

8. The pet garment according to claim 7, wherein when the care portion is separated from the abdomen area of the pet torso, the care portion is located posterior of the rear back portion, then the left connecting strap is connected to the right connecting strap to form a rolling core, the rolling core is sequentially rolled along an outer side of the care portion and an outer side of the rear back portion to roll up and store the care portion and the rear back portion.

9. The pet garment according to claim 8, wherein a flexible care layer is disposed on an inner side of the care portion, a care space is formed between the flexible care layer and the care portion, when the care portion is rolled up and stored, the flexible care layer is rolled up and stored along with the care portion.

10. The pet garment according to claim 1, wherein the left connecting strap and the right connecting strap are detachably connected, the care portion is separable from the abdomen area of the pet torso upon disconnection of the left connecting strap and the right connecting strap; and
when the care portion is separated from the abdomen area of the pet torso, the care portion is located posterior of the rear back portion, then the left connecting strap is connected to the right connecting strap to form a rolling core, the rolling core is sequentially rolled along an outer side of the care portion and an outer side of the rear back portion to roll up and store the care portion and the rear back portion.

11. The pet garment according to claim 10, wherein a flexible care layer is disposed on an inner side of the care portion, a care space is formed between the flexible care layer and the care portion, when the care portion is rolled up and stored, the flexible care layer is rolled up and stored along with the care portion.

12. The pet garment according to claim 11, wherein the flexible care layer is made of cotton fabric.

13. The pet garment according to claim 11, wherein the left connecting strap is rightwardly bent toward the care portion;
the right connecting strap is leftwardly bent toward the care portion; and
the left connecting strap and the right connecting strap are connected at the care portion to form the rolling core at the care portion.

14. The pet garment according to claim 13, wherein the care space extends into the left connecting strap to form a left access opening, the left access opening is closed after bending of the left connecting strap; and
the care space extends into the right connecting strap to form a right access opening, the right access opening is closed after bending of the right connecting strap.

15. The pet garment according to claim 13, wherein a fourth engagement portion is disposed on the left connecting strap and a fifth engagement portion is disposed on the right connecting strap for enabling detachable connection between the left connecting strap and the right connecting strap.

16. The pet garment according to claim 11, wherein the care space is configured to accommodate nursing items selected from heat packs, ice packs, and absorbent pads.

17. The pet garment according to claim 1, wherein the care portion, the left connecting strap, and the right connecting strap form a T-shaped structure.

18. The pet garment according to claim 1, wherein a tail opening is defined at a junction between the rear back portion and the care portion, when the care portion is wrapped around the pet tail, the tail opening allows the pet tail to pass through.

19. The pet garment according to claim 1, wherein the front covering portion and the rear covering portion are made of elastic material.

20. A pet garment, comprising:
a front covering portion; and
a rear covering portion;
wherein the front covering portion is configured to cover a front area of a pet torso, and the front covering portion extends rearward to form the rear covering portion;
the rear covering portion comprises a rear back portion and a care portion, the rear back portion is anteriorly disposed and configured to cover a rear back area of the pet torso, and the care portion is posteriorly disposed and configured to wrap around a pet tail and extend frontward to cover an abdomen area of the pet torso;
the care portion extends leftward to form a left connecting strap and extends rightward to form a right connecting strap, the left connecting strap and the right connecting strap are respectively disposed at a left side of the care portion and a right side of the right side of the care portion for fixation, so that the rear covering portion covers a rear area of the pet torso; and
a flexible care layer is disposed on an inner side of the care portion, a care space is formed between the flexible care layer and the care portion, when the care portion is rolled up and stored, the flexible care layer is rolled up and stored along with the care portion.

* * * * *